United States Patent
Foote et al.

(10) Patent No.: US 6,714,945 B1
(45) Date of Patent: Mar. 30, 2004

(54) SYSTEM, METHOD, AND ARTICLE OF MANUFACTURE FOR PROPAGATING TRANSACTION PROCESSING FACILITY BASED DATA AND FOR PROVIDING THE PROPAGATED DATA TO A VARIETY OF CLIENTS

(75) Inventors: William E. Foote, Tulsa, OK (US); Scott A. Luttenberg, Broken Arrow, OK (US); Farid M. Mehovic, Hurst, TX (US); R. Craig Murphy, Colleyville, TX (US); Robin B. Tait, Tulsa, OK (US); Paul R. Wright, Broken Arrow, OK (US)

(73) Assignee: Sabre Inc., Southlake, TX (US)

( * ) Notice: Subject to any disclaimer, the term of this patent is extended or adjusted under 35 U.S.C. 154(b) by 419 days.

(21) Appl. No.: 09/617,509

(22) Filed: Jul. 17, 2000

Related U.S. Application Data

(63) Continuation-in-part of application No. 08/588,463, filed on Jan. 18, 1996, now Pat. No. 6,122,642, which is a continuation of application No. 08/560,466, filed on Nov. 17, 1995, now abandoned, which is a continuation of application No. 08/560,295, filed on Nov. 17, 1995, now abandoned.

(51) Int. Cl.$^7$ ............................................. G06F 17/30
(52) U.S. Cl. ...................... 707/104.1; 707/10; 707/102; 707/200; 705/6; 709/201
(58) Field of Search .......................... 707/5, 10, 104.1, 707/3, 4, 6, 9, 7, 204; 705/5, 6; 709/200, 206, 201, 202, 203, 314; 370/40; 714/5, 15

(56) References Cited

U.S. PATENT DOCUMENTS

| | | | |
|---|---|---|---|
| 4,677,569 A | 6/1987 | Nakano et al. | 704/275 |
| 4,714,995 A | 12/1987 | Materna et al. | 707/201 |

(List continued on next page.)

FOREIGN PATENT DOCUMENTS

| | | |
|---|---|---|
| WO | WO 97 30404 A | 8/1997 |

OTHER PUBLICATIONS

Attaluri et al., "Concurrency Control of Large Unstructured Data," IEEE, pp. 314–323, 1998.

IBM Transaction Processing Facility–General Information Manual Version 3.1–First Edition (Jun. 1989).

*Oracle Data Mart Builder, Getting Started*; Feb. 1999; Oracle Corporation, Redwood City, California; 36 pages; available at <http://otn.oracle.com/doc/dms.25/pdf/dmbg-s.pdf> (visited Nov. 1, 2002).

Jesus Bisbal, Deirdre Lawless, Bing Wu, Jane Grisom; *Legacy Information System Migration: A Brief Review of Problems, Solutions and Research Issues*; Trinity College Dublin Computer Science Department Technical Reports; 1999; 18 pages; vol. 1999, No. 38; XP 002226579; Dublin, Ireland; available at <http://citeseer.nj.nec.com/398128.html> (visited Jan. 8, 2003).

(List continued on next page.)

*Primary Examiner*—Shahid Alam
(74) *Attorney, Agent, or Firm*—Alston & Bird LLP

(57) ABSTRACT

A system, method, and article of manufacture for propagating data from a transaction processing facility (TPF) based computer to a relational database associated with a server computer and providing the propagated data to a variety of clients are presented. A TPF based computer includes TPF data, which is propagated to the server computer. The server computer is coupled to the TPF based computer. The server computer receives the propagated TPF data and generates a structured query language (SQL) statement reflecting the received TPF data. The relational database associated with the server computer is updated by using the generated SQL statement. The propagated data may be provided to a variety of clients.

48 Claims, 7 Drawing Sheets

U.S. PATENT DOCUMENTS

| | | | |
|---|---|---|---|
| 4,862,357 A | 8/1989 | Ahlstrom et al. | 705/6 |
| 4,875,155 A | 10/1989 | Iskiyan et al. | 711/113 |
| 5,006,978 A | 4/1991 | Neches | 709/102 |
| 5,113,499 A | 5/1992 | Ankney et al. | 340/5.74 |
| 5,187,787 A | 2/1993 | Skeen et al. | 709/314 |
| 5,201,046 A | 4/1993 | Goldberg et al. | 707/100 |
| 5,220,501 A | 6/1993 | Lawlor et al. | 705/40 |
| 5,225,990 A | 7/1993 | Bunce et al. | 700/226 |
| 5,231,670 A | 7/1993 | Goldhor et al. | 704/275 |
| 5,253,166 A | 10/1993 | Dettelbach et al. | 705/5 |
| 5,255,184 A | 10/1993 | Hornick et al. | 705/6 |
| 5,257,366 A | 10/1993 | Adair et al. | 707/4 |
| 5,278,978 A | 1/1994 | Demers et al. | 707/101 |
| 5,311,425 A | 5/1994 | Inada | 705/6 |
| 5,317,568 A | 5/1994 | Bixby et al. | 370/401 |
| 5,319,773 A | 6/1994 | Britton et al. | 714/15 |
| 5,347,632 A | 9/1994 | Filepp et al. | 709/202 |
| 5,381,534 A | 1/1995 | Shi | 709/203 |
| 5,390,314 A | 2/1995 | Swanson | 717/138 |
| 5,416,917 A | 5/1995 | Adair et al. | 707/203 |
| 5,450,581 A | 9/1995 | Bergen et al. | 707/9 |
| 5,537,533 A | 7/1996 | Staheli et al. | 714/5 |
| 5,560,005 A | 9/1996 | Hoover et al. | 707/10 |
| 5,564,113 A | 10/1996 | Bergen et al. | 707/4 |
| 5,570,283 A | 10/1996 | Shoolery et al. | 705/5 |
| 5,586,312 A | 12/1996 | Johnson et al. | 707/10 |
| 5,628,011 A | 5/1997 | Ahamed et al. | 707/10 |
| 5,680,618 A * | 10/1997 | Freund | 707/7 |
| 5,692,174 A | 11/1997 | Bireley et al. | 707/3 |
| 5,758,149 A | 5/1998 | Bierma et al. | 707/8 |
| 5,794,229 A | 8/1998 | French et al. | 707/2 |
| 5,839,114 A | 11/1998 | Lynch et al. | 705/5 |
| 5,956,707 A | 9/1999 | Chu | 707/3 |
| 6,115,711 A * | 9/2000 | White | 707/10 |
| 6,122,642 A * | 9/2000 | Mehovic | 707/104.1 |
| 6,438,538 B1 * | 8/2002 | Goldring | 707/3 |
| 6,622,152 B1 * | 9/2003 | Sinn et al. | 707/204 |

OTHER PUBLICATIONS

*Transaction Processing Facility, General Information*; Sep. 1993; IBM Corporation, Poughkeepsie, New York; XP002226769; available at <http://www-3.ibm.com/software/ts/tpf/images/gtpgim00.pdf> (visited Jan. 10, 2003).

\* cited by examiner

SYSTEM, METHOD, AND ARTICLE OF MANUFACTURE FOR PROPAGATING TRANSACTION PROCESSING FACILITY BASED DATA AND FOR PROVIDING THE PROPAGATED DATA TO A VARIETY OF CLIENTS

RELATED APPLICATIONS

The present application is a continuation-in-part of a U.S. patent application Ser. No. 08/588,463, filed Jan. 18, 1996 now U.S. Pat. No. 6,122,642, which is a continuation of U.S. Pat. Nos. 08/560,295 and 08/560,466, both filed on Nov. 17, 1995 and now abandoned. The content of all aforesaid is relied upon and is hereby incorporated by reference.

BACKGROUND OF THE INVENTION

A. Field of the Invention

The present invention relates to electronic data manipulation, and more particularly, to a system, method, and article of manufacture for propagating Transaction Processing Facility ("TPF") based data to a non-TPF based platform, such as a relational database, in a timely and effective manner, and for providing the propagated data to a variety of clients.

B. Description of the Related Art

Transaction Processing Facility ("TPF") is a term recognized throughout the data processing industry, and refers to an operating system that is used with mainframes. TPF is highly specialized, real-time, and used for processing transactions. A TPF based system maximizes hardware and software resources for processing real-time transactions efficiently. As a result of its real-time transaction processing capability, many industries, such as airline and banking, heavily rely on such a TPF based system. Moreover, the data stored on a TPF based system, for example, in EBCIDIC (Extended Binary-Coded Decimal Interchange Code) format, is very valuable because it represents real-time information, i.e., information that is maintained in as current a manner as possible.

TPF based systems, however, also have several disadvantages, including problems with development and low data management functionality. The development of TPF and its applications is slow, costly, and tedious, primarily because portions of TPF and many of its applications are written in mainframe assembler language.

In addition to the problems with development, current TPF based systems have low data management functionality. Specifically, current TPF based systems fail to respond adequately to application independence and critical data accessibility requirements of many industries that use the TPF based systems.

Unlike information governed by a relational database or a relational database management system (RDBMS), which supports Structured Query Language (SQL), data resident on current TPF based systems may only be accessed and utilized by applications managed through the limited purpose TPF control programs. For example, if a travel agent needs to obtain a list of passengers scheduled to fly to a particular airport, a TPF based application written for the particular purpose of obtaining that passenger list may be needed. Then, if the travel agent needs some other information, another TPF based application may be needed to execute that particular request. On the other hand, with a relational database, the travel agent may only need to change the query instead of needing different applications for different requests.

Moreover, although a TPF based system maintains huge volumes of real-time data, it is deficient in its ability to present this data in a timely and effective manner for use by non-TPF based applications, such as RDBMS based applications. For example, if a non-TPF based application requires data stored within a TPF based system, such data can be either (1) copied into the non-TPF environment via a batch-processing scenario, or (2) retrieved from the TPF based system via on-line communication channels, such as screen-scraping. Each option is deficient because if the non-TPF based application needs real-time data, option (1) becomes unfeasible due to processing delays and data accuracy impact that is associated with host processor and storage device overhead. Option (2) also becomes equally unacceptable due to communications delay, for example, when the application requires reference to more than a single element of real-time data. Option (2) bears the further significant detriment of requiring extensive modification to applications within the TPF based system to facilitate presentation of such data.

Accordingly, there is presently a need for a system, method, and article of manufacture that allows a variety of clients to have access to the TPF data in a timely and effective manner.

SUMMARY OF THE INVENTION

The present invention provides a data processing system for propagating transaction processing facility (TPF) data from a TPF based computer to a relational database associated with a server computer and making this data available to a variety of clients. The system includes the TPF based computer and the server computer, which is coupled to the TPF based computer. The server computer receives the TPF data propagated from the TPF based computer and generates a structured query language (SQL) statement reflecting the received TPF data. The relational database that is associated with the server computer is updated by using the generated SQL statement.

In addition to the system, the present invention also provides a data propagation method for propagating data from a TPF based computer to a relational database associated with a server computer. In this method, the data is propagated from the TPF based computer to the server computer. The server computer generates a SQL statement reflecting the propagated data. The relational database corresponding to the server computer is updated with the use of the generated SQL statement.

In another aspect, the present invention provides a data processing system that assists with miscellaneous function management requests. Such a system includes a TPF based computer with TPF data; a server computer with a relational database, coupled to the TPF based computer, wherein the relational database includes a structured replica of the TPF data; and a client terminal for sending miscellaneous function management requests to the TPF based computer. The TPF based computer sends the request to the server computer. The server computer receives the miscellaneous function management request, generates a SQL statement reflecting the miscellaneous function management request, and sends the generated SQL statement to the relational database.

In still another aspect, the present invention provides a method that assists with miscellaneous function management requests. In this method, a client terminal sends a miscellaneous function management request to a TPF based computer. The TPF based computer sends the request to a server computer. The server computer includes a relational database that has a structured replica of data stored on the TPF based computer. The server computer generates a SQL statement reflecting the miscellaneous function management request and sends the SQL statement to the relational database.

The present invention also provides a computer-readable medium containing instructions for causing a computer to perform a method for propagating data. In this method, the data is propagated from the TPF based computer to a server computer. The server computer generates a SQL statement reflecting the propagated data. The relational database associated with the server computer is updated with the use of the generated SQL statement.

In yet another aspect, the present invention provides a computer-readable medium containing instructions for causing a computer to perform a method for assisting with miscellaneous function management requests. In this method, a client terminal sends a miscellaneous function management request to a TPF based computer. The TPF based computer sends the request to the server computer. The server computer includes a relational database that has a structured replica of data stored on the TPF based computer. The server computer generates a SQL statement reflecting the miscellaneous function management request and sends the SQL statement to the relational database.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Figure 1:
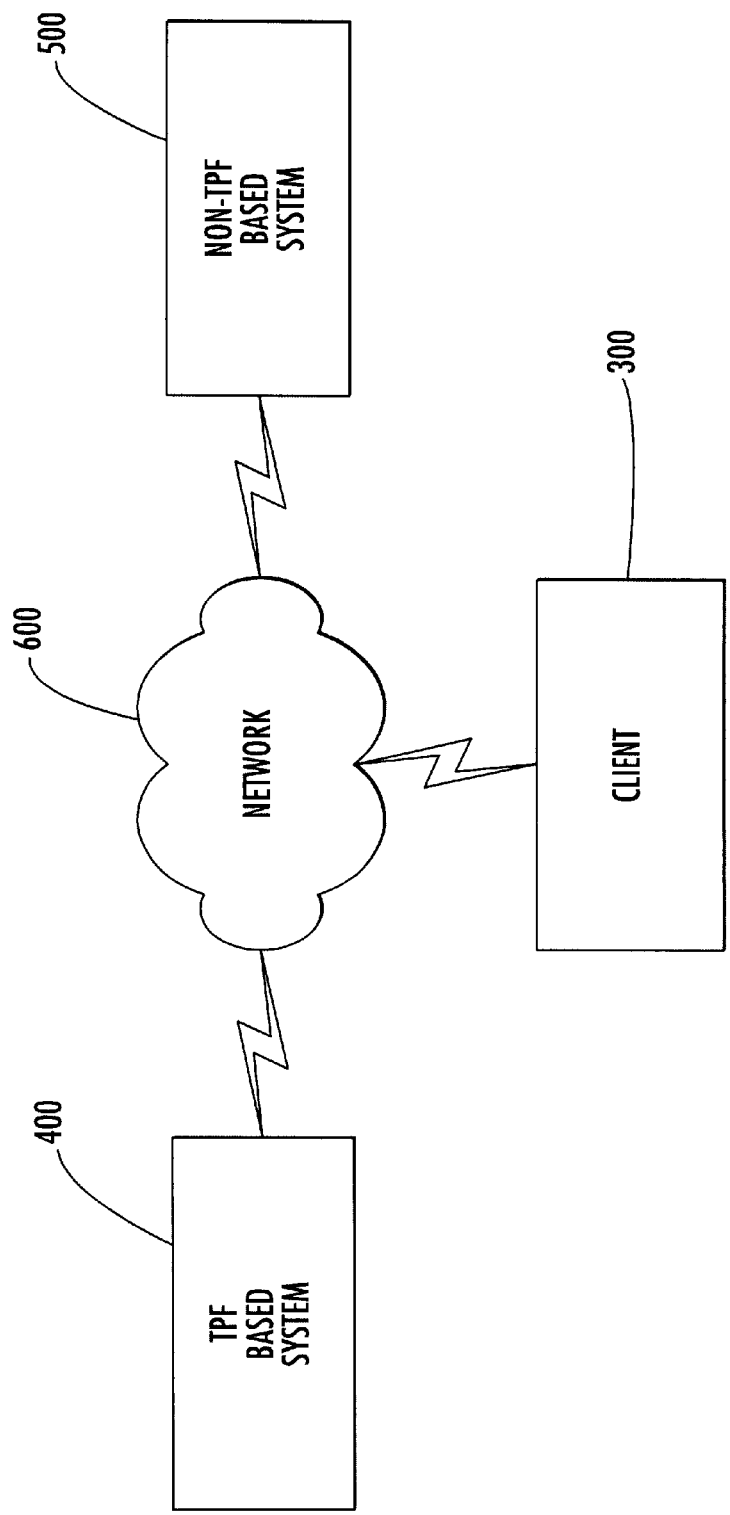
FIG. 1 is a diagram of an exemplary network environment in which features of the present invention may be implemented.

The following detailed description of the invention refers to the accompanying drawings. While the description includes exemplary embodiments, other embodiments are possible, and changes may be made to the embodiments described without departing from the spirit and scope of the invention. The following detailed description does not limit the invention. Instead, the scope of the invention is defined by the appended claims and their equivalents.

The present invention provides a system, method, and article of manufacture to propagate TPF based data to a non-TPF based platform, such as a relational database, in a timely and effective manner. As a result, the non-TPF based platform may have a replica of the data stored on a TPF-based system. Moreover, the data may be propagated asynchronously or synchronously, and in real-time or after set intervals.

The present invention also provides the propagated data to a variety of clients. A client, for example, may be a computer that accesses the data directly from the relational database; a registered system that receives data, in real-time, as its being propagated from the TPF based system; an extraction and transformation client, such as a data warehouse or a data mart; or a non-SQL (Structured Query Language) client. A non-SQL client, such as a client that only has a command line interface, does not have the capability to generate SQL statements. Instead, such a non-SQL client can only generate either English language commands or other type of queries. However, the system and method of the present invention enable even a non-SQL client to access data from the non-TPF based platform. Moreover, the present invention provides for miscellaneous function management, such as providing e-mail capabilities and database statistics. For example, with the present invention, a travel agent who is connected to a TPF based system may e-mail reservation data to a customer via the non-TPF based platform.

The above-noted features, other aspects, and principles of the present invention may be implemented in various system or network environments to provide automated and computational tools to facilitate propagation of the TPF based data and to provide the propagated data to a variety of clients. Such environments and applications may be specially constructed for performing the various processes and operations of the invention or they may include a general purpose computer or computing platform selectively activated or reconfigured by program code to provide the necessary functionality. The processes disclosed herein are not inherently related to any particular computer or other apparatus, and may be implemented by a suitable combination of hardware, software, and/or firmware. For example, various general purpose machines may be used with programs written in accordance with teachings of the invention, or it may be more convenient to construct a specialized apparatus or system to perform the required methods and techniques.

The present invention also relates to computer readable media that include program instruction or program code for performing various computer-implemented operations based on the methods and processes of the invention. The media and program instructions may be those specially designed and constructed for the purposes of the invention, or they may be of the kind well-known and available to those having skill in the computer software arts. The media may take many forms including, but not limited to, non-volatile media, volatile media, and transmission media. Non-volatile media includes, for example, optical or magnetic disks. Volatile media includes, for example, dynamic memory. Transmission media includes, for example, coaxial cables, copper wire, and fiber optics. Transmission media can also take the form of acoustic or light waves, such as those generated during radio-wave and infra-red data communications. Examples of program instructions include both machine code, such as produced by compiler, and files containing a high level code that can be executed by the computer using an interpreter.

SYSTEM ARCHITECTURE

FIG. 1 is a diagram of an exemplary network environment in which features of the present invention may be implemented. The network environment includes client 300, TPF based system 400; and non-TPF based system 500, all of which are interconnected by network 600. Network 600 may be a single or a combination of any type of computer network, such as the Internet, an Intranet, an Extranet, a Local Area Network (LAN), or a Wide Area Network (WAN), for example. These as well as other network configurations are known to those skilled in the art and are also within the scope of the present invention.

Client 300

Client 300 of FIG. 1 may include, but is not limited to, a workstation, a computer, a printer, a facsimile, a registered system, an extraction and transformation client, and a non-SQL client. Client 300 may be used as an input, for example, to enter data into the TPF based system 400, or an output, for example, to retrieve data from the TPF or the non-TPF based system 500.

Client 300 may be directly connected to the non-TPF based system 500. These clients may either retrieve the data stored in the non-TPF based system 500 or may receive the data from the non-TPF based system 500. Moreover, these type of clients may include computers running non-TPF based applications, such as RDBMS applications. Non-TPF based applications may access data from the non-TPF based system 500.

Client 300 also may be a registered system that registers its data requirements and data formats with the non-TPF system 500. Data meeting the registered system's requirements may be made available via multiple delivery mechanisms. For example, the non-TPF system 500 may provide data meeting a registered system's criteria in real time to the registered system.

Moreover, the client 300 may be an extraction and transformation client, which includes, but is not limited to, a data warehouse and a data mart. A data warehouse may be a RDBMS based computer system, which is designed to store large amounts of data and perform complex queries against this stored data. A data mart is very similar to a data warehouse, but only has a subset of the data for use with a specific purpose. For example, a data warehouse may store reservation data for airlines and hotels, whereas a data mart may store reservation data for airlines only.

Furthermore, with the present invention, a non-SQL client may be able to access data from the non-TPF based system 500. A non-SQL client is one that does not have the capability to generate SQL statements. An example of a non-SQL client is a user, such as a travel agent, who only has access to a command line interface. In such cases, the present invention may provide a travel agent with commands, which may be translated by the present invention into SQL statements and thus, may allow the travel agent to access the data from the non-TPF based system 500. Access may include querying the non-TPF based data.

In addition, client 300 may simultaneously access both the TPF based system 400 and the non-TPF based system 500. For example, if the client 300 is a computer, the computer may interact with the TPF based system 400 using an emulator or a command line interface, whereas the computer may interact with the non-TPF based system 500 using RDBMS applications. These as well as other clients will known to those skilled in the art and are also within the scope of the present invention.

TPF Based System 400

The TPF based system 400 of FIG. 1 may include a single or a series of mainframe computers, such as the IBM 9032.

Figure 2:
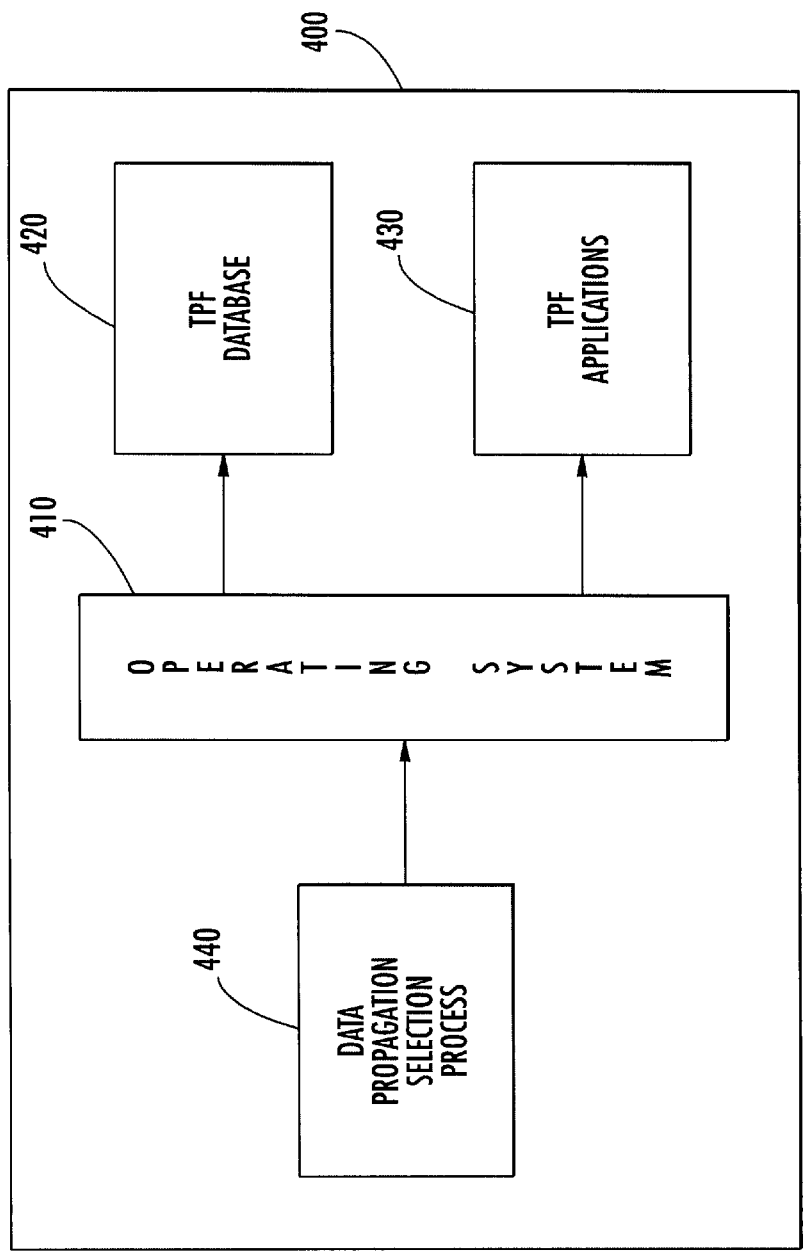
FIG. 2 is an exemplary block diagram illustrating components of the TPF based system 400 that is shown in FIG. 1.

Moreover, as shown in FIG. 2, the computers in the TPF based system 400 may include operating system 410, TPF database 420, a plurality of TPF applications 430, and data propagation selection process 440. Although not shown, the computers may also include input devices, such as a keyboard; output devices, such as a monitor; memory; and a processor. These, other typical components, and the operation of a TPF based system 400 are known to those skilled in the art and are also within the scope of the present invention. For example, it is known that upon receiving an application program processing request, the TPF operating system 410 passes control to the appropriate TPF application 430 to process a user request.

The data propagation selection process 440 located in the TPF based system 400 may be used to satisfy several requests, including, but not limited to, updating the data, a request to access propagated data; a request to e-mail propagated data to the customer; and providing database statistics. For example, database statistics may include providing a travel agent with statistics, such as the number of customers who made airline reservations using the travel agent and the total number of airline customers who also made hotel reservations. With this information, the travel agent may, for example, realize that the agent needs a better marketing program to increase the number of customers that make both airline and hotel reservations. The above requests may be classified into two categories: TPF data update requests and miscellaneous function management requests. The requests may fall under either or both the categories. For example, updating and e-mail may fall under both, whereas access and providing database statistics falls under miscellaneous function management only. Updating may include, but is not limited to, creating, modifying, and deleting. Access includes querying the data.

The difference between the two categories, TPF data update request and miscellaneous function management request, is that with the TPF data update request, the entire data record is sent to the non-TPF based system 500, whereas, with the miscellaneous function management request, only part of the data record is sent to the non-TPF based system 500. For example, updating is classified under both categories because when creating a new data record, the whole record is sent to the non-TPF system 500, whereas when deleting a record, only a reference to the data record is sent to the non-TPF based system 500.

Similarly, e-mail falls under both categories, but the miscellaneous function management e-mail request is different from the TPF data update e-mail request in that the TPF data update e-mail request sends the entire data record for propagation and then, e-mails the data to the recipient. On the other hand, the miscellaneous function management e-mail request is for use with retrieving and sending data that is stored in the non-TPF based system 500, and thus, only a reference to the data record is sent to the non-TPF based system 500. For example, if a travel agent wants to send data that contains information about a new reservation to a customer, the travel agent may use the TPF data update e-mail request. On the other hand, if the travel agent needs to send information about an already existing reservation to a customer, the travel agent may use the miscellaneous function management e-mail request. In the latter case, a reference to the data will be sent to the non-TPF based system 500, the data will be retrieved from the non-TPF based system 500, and then, sent to the customer via e-mail.

The miscellaneous function management access request may be used by a non-SQL client, such as a client that only has a command line interface and that needs to access the data stored in the non-TPF based system 500. Access includes querying the data stored in the non-TPF based system 500. The data propagation selection process 440 is further explained in detail in the following description.

Non-TPF Based System 500

Figure 3:
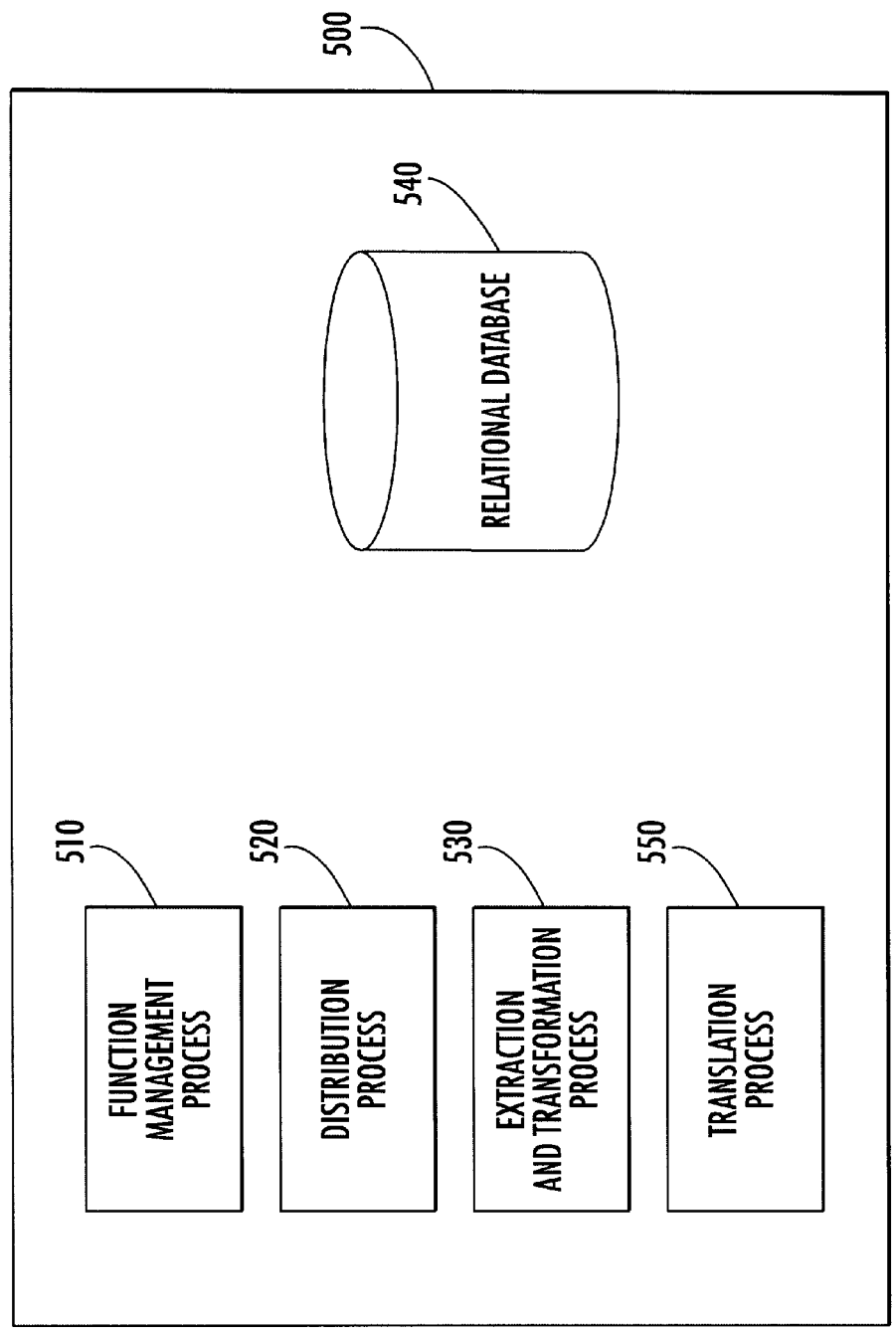
FIG. 3 is an exemplary block diagram illustrating components of the non-TPF based system 500 that is shown in FIG. 1.

The non-TPF based system 500 shown in FIG. 1 also may include a single or a series of computers. Furthermore, as shown in FIG. 3, one or more of the computers in the non-TPF based system 500 may include a function management process 510, distribution process 520, extraction and transformation process 530, translation process 550, and a relational database 540. The function management process 510, in conjunction with the data propagation selection process 440, assists in satisfying the TPF data update and miscellaneous function management requests. The function management process 510 also provides the propagated data to the distribution process 520. The distribution process 520 sends the data to any registered systems and assists in completing some of the miscellaneous function management requests, such as providing e-mail capability to a TPF user. The extraction and transformation process 530 extracts, transforms, and then, sends the data to an extraction and transformation client, such as a data warehouse or a data mart. The translation process 550 assists with accessing data from the relational database 540 upon a receiving a request from a non-SQL client. The relational database 540 stores the propagated data.

Although not shown, the computers in the non-TPF system 500 may also include input devices, such as a keyboard; output devices, such as a monitor; memory, such as random access memory (RAM) and/or read only memory (ROM); and a processor. These and other typical components are known to those skilled in the art and are also within the scope of the present invention.

DATA PROPAGATION SELECTION PROCESS

Figure 4:
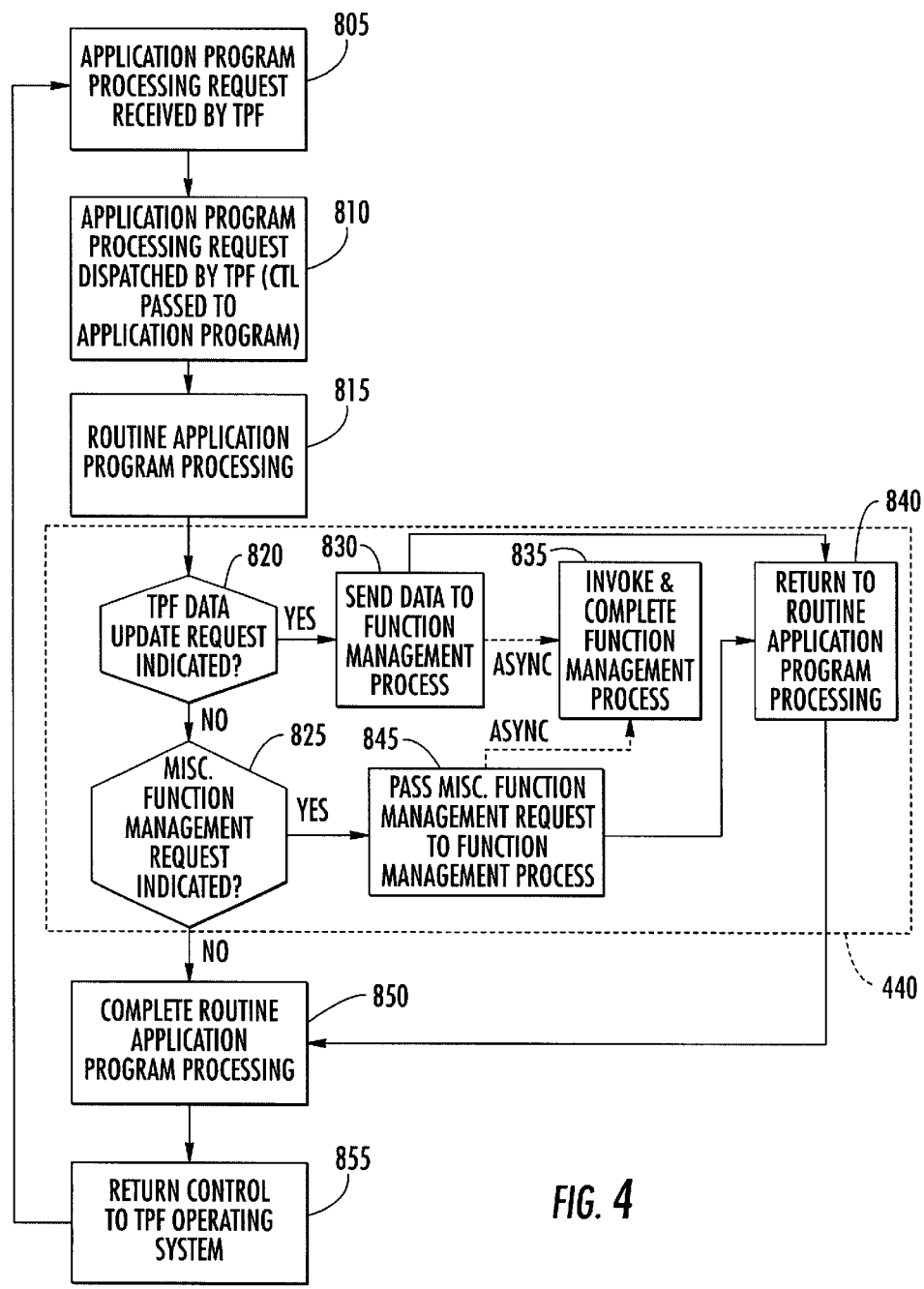
FIG. 4 is an exemplary flowchart illustrating the data propagation selection process 440 of the present invention.
Figure 5:
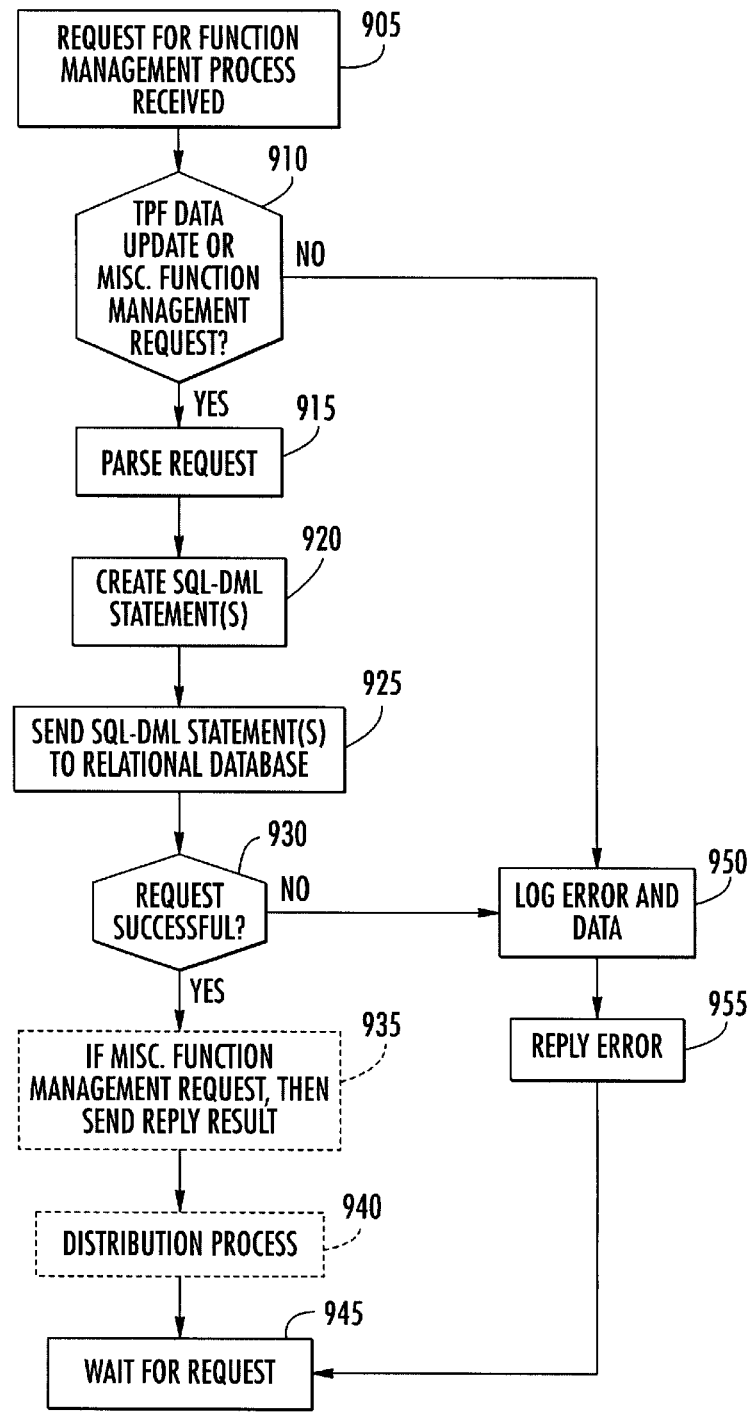
FIG. 5 is an exemplary flowchart illustrating the function management process 510 of the present invention.

FIGS. 4 and 5 are exemplary flow charts of the steps involved in the data propagation selection process 440, the function management process 510, and the distribution process 520. The data propagation selection process 440 that is resident on the TPF based system 400 is shown by the dotted rectangle in FIG. 4. The data propagation selection process 440 comprises a series of steps that may occur in real time, for example, immediately after a TPF application updates the data, or after a set interval. However, prior to the data propagation selection process 440, a request, such as a TPF data update or a miscellaneous function management request, is generated in steps 805, 810, and 815.

In a step 805, the TPF based system 400 receives an application program processing request from a user. For example, a user, such as a travel agent, may want to create or update an airline, car, or hotel reservation for a customer. Thus, the travel agent places such a request, using client 300, with the TPF based system 400. In step 805, the TPF based system 400 receives such a request. Next, in a step 810, the system 400 dispatches the application program processing request, for example, by finding the appropriate TPF application 430 to satisfy the user's request and passes control to the application 430. Then, in a step 815, the application 430 performs routine processing. For example, in step 815, the travel agent may make all appropriate updates to the reservation data.

In steps 820 and 825, the system determines whether a TPF data update or a miscellaneous function management request is indicated. To determine whether a TPF data update request or function management request is indicated, the system may examine the request using a predetermined criteria. For example, in the case of airlines, the criteria may be that only requests relating to the specified airlines are propagated. Alternatively, the criteria may be that all requests are propagated to the non-TPF based system 500.

If in step 820 or 825, it is determined that either a TPF data update request or a function management request is indicated, the request is sent to the function management process 510, as indicated by steps 830 and 845. If the request is a TPF data update request, the system sends the data to the function management process 510 that is resident on the non-TPF based system 500, as indicated by step 840. On the other hand, if the request is a miscellaneous function management request, the request is sent to the function management process 510, as indicated by step 845. However, as mentioned in the foregoing description, with the miscellaneous function management request, only a reference or part of the data record is sent instead of sending the entire data record.

The passing of the data or reference to the data invokes the function management process 510 and this process completes the TPF data update or the miscellaneous function management request, as indicated in step 835. In one embodiment, the function management process 510 completes both the TPF data update and the function management process 510 asynchronously, as shown by the dotted arrows in FIG. 4. However, in other embodiments, the requests may be processed synchronously, asynchronously, or in a combination of both. Such embodiments are also within the scope of the present invention. If the requests are processed asynchronously, the user does not need to wait for completion of the function management process 510, and instead may return and complete routine application program processing, as indicated by steps 840 and 850.

If in steps 820 or 825, a TPF data update or a miscellaneous function management request is not indicated, the user completes routine application program processing, as indicated by step 850. Once the application program processing is complete, the control is returned to the operating system 410 in the TPF based system 500, as indicated by a step 855. For example, once the travel agent is done with updating the reservation data, the travel agent may log off from the system and thus, return control to the operating system 410.

FUNCTION MANAGEMENT PROCESS 510

The function management process 510 and distribution process 520 will be explained now with reference to FIG. 5. An exemplary flow chart of the function management process 510 is shown in FIG. 5. In a step 905, a request for the function management process is received from the TPF based system 400. This request may be the result of step 835 of FIG. 4, for example. Next, in step 910, the system determines whether the request is a TPF data update request or a miscellaneous function management request. If the request is a TPF data update request, the propagated data is parsed and transformed into an object containing a structured relational representation of the data, as indicated by a step 915. For example, the propagated data may be parsed into discrete attributes and converted into a CORBA (Common Object Request Broker Architecture) compliant data object. In the travel agent example, if the travel agent created a new reservation, the new reservation data may be first sent to the function management process 510 by the data propagation selection process 440, and then, the propagated data may be parsed and transformed into a data object containing a structured relational representation of the data in step 915. Alternatively, if the request is a miscellaneous function management request, the received request and reference to the data also are parsed in step 915. For example, if the travel agent deleted an existing reservation, the deletion request and the reference to the deleted reservation are sent to the function management process 510 by the data propagation selection process 440, and then, the deletion request and the reference to the deleted reservation are parsed I in step 915.

After parsing, SQL-DML (Structured Query Language—Data Manipulation Language) statements are created in step 920. For example, in the case of a new reservation record, SQL statements for insertion of such data into the relational database 540 are created in step 920. On the other hand, in the case of deletion of a reservation record, SQL statements for deletion of the such data from the relation database 540 are created in step 920. The SQL statements used for database updates may be generated, for example, as part of an offline build process. The relational database schema and data cross reference spreadsheets may be inputs to this offline build process. Since a relational database stores data in the form of related tables, a data cross reference spreadsheet may include table names, column names, column data types, and column data source for the relational database 540. The outputs of this offline build process may be embedded SQL statements that are stored within a runtime table structure that is accessed and modified dynamically at runtime to complete the SQL statement. For example, in step 920, the SQL statements may be accessed from the runtime table structure and then, the accessed SQL statements may be modified with the parsed data to complete the SQL statements, which may be then used to update the relational database 540.

Then, in step 925, the SQL statements reflecting the data propagation request or the miscellaneous function management request are sent to update or search the target relational database 540. For example, updating includes inserting the parsed and transformed data by using the SQL statements generated in step 920. Searching includes searching the relational database using the SQL statements generated in step 920.

In step 930, the system determines whether the update or search was successful. To determine whether the update or search was successful, the system may, for example, examine a return code sent by the relational database. If the update or search of the relational database 540 was successful, then, the system waits for another request, as indicated by step 945. However, as indicated in step 935, if the request was a miscellaneous function management request, a reply may be sent to the user before the system returns to the wait stage. For example, if a travel agent placed a miscellaneous function management access request, the result to the access request may be sent back to the travel agent via the TPF based system 400 in step 935 so that the result can be displayed to the travel agent. Step 935 is optional as indicated by the dotted lines and only applies to the miscellaneous function management requests. Moreover, as indicated by a step 940, after the update or search of the relational database in step 925, the request and the data may be optionally sent to the distribution process 520, which is explained in the following description.

On the other hand, if a TPF data update or a miscellaneous function management request does not exist in step 910 and/or if the update or search of the relational database was not successful in step 930, an error may be generated, and the error and/or the data may be logged for investigation in step 950. Moreover, a reply error may be sent to the user in step 955. For example, the reply error may be sent to the user, such as a travel agent, via the TPF based system 500. The error may inform the travel agent of the type of error generated and what the travel agent needs to do to correct the error. Then, the system returns to the wait stage, as indicated by a step 945.

Although the function management process 510 was described as a single process in the foregoing description, the function management process 510 may be divided into different processes. For example, the function management process 510 may be divided into a retriever, a parser, and an inserter process. The retriever process may by responsible for the management of the request. After receiving the request, the retriever process may send the request to the parser process, which may parse the request into discrete attributes and covert it into a CORBA compliant data object. Next, the retriever process may request the inserter process to generate a series of SQL statements for updating the relational database 540. Then, the retriever process may send the SQL statements to the relational database 540 for updating the database. These and other modifications to the function management process 510 are known to those skilled in the art and are within the scope of the present invention.

DISTRIBUTION PROCESS 520

The distribution process 520 may provide e-mail capabilities and may provide propagated data to registered systems. For example, a travel agent who wants to e-mail new reservation data or existing reservation data to a customer may use the distribution process to send an e-mail to the customer with this information. If the travel agent wants to send new reservation data, the travel agent, for example, may send an e-mail request as well as the propagated data to the function management process 510. After the function management process has updated the relational database 540 with the new reservation data, step 940 of the function management process passes the new reservation data and e-mail request to the distribution process 520, which in turn e-mails the reservation data to the customer. On the other hand, if the travel agent needs to send existing reservation data to a customer, the travel agent may send a miscellaneous function management e-mail request to the TPF based system 400. The TPF based system 400 sends the request to the function management process 510, which in turn, retrieves the data in step 930 and sends the data to the distribution process 520. The distribution process 520 sends this data to the customer in an e-mail.

The distribution process may also provide the propagated data to a client 300, such as a registered system, in real time. Client 300 may register its data requirements and required data formats with the distribution process. When the distribution process receives data from the function management process 510, it checks the data and the list of client request to determine a match. If there is a match, the data may be made available to the client 300 via multiple delivery mechanisms. For example, the data may be sent using readily available communication protocols, such as CORBA's IIOP (Internet Inter-Object Request Broker Protocol). Moreover, the distribution process may send the data to the registered systems in real time, as it is being propagated from the TPF based system 400 or after a set interval.

EXTRACTION AND TRANSFORMATION PROCESS 530

The present invention also provides the ability to provide data to a client 300, such as an extraction and transformation client, for example, a data mart or a data warehouse. The extraction and transformation process 530 provides the data to the extraction and transformation clients. The extraction and transformation process 530 is a batch process that copies data from the relational database 540, transforms the data to meet the requirements of the extraction and transformation client, and places the data into a file for loading into the extraction and transformation client, such as a data warehouse or data mart. For example, as part of the process 530, conversion tables may be used to transform data attributes to meet the requirements. The airport designation DFW, for example, may be transformed to Dallas/Ft. Worth by the tables. Other examples of transformation may include currency conversion and date formats.

TRANSLATION PROCESS 550

The present invention also provides a translation process 550, which may be used by a non-SQL client. Although a TPF based system 400 provides access to the TPF data, it provides minimal or no query ability. In addition, any query ability provided by the TPF based system 400 may require new applications, which may not be readily available for use by the user. Thus, a non-SQL client, such as a computer with a command line interface, which is only connected to a TPF based system 400, may not be able to place a query requests against the TPF data stored in the TPF database 420. The translation process 550, however, provides the ability of accessing, which includes querying, the propagated data that is stored in the relational database 540. Since the relational database 540 may have a relational replica of the database 420, the non-SQL client does not loose any data by querying the relational database 540 instead of the TPF database 420.

Figure 6:
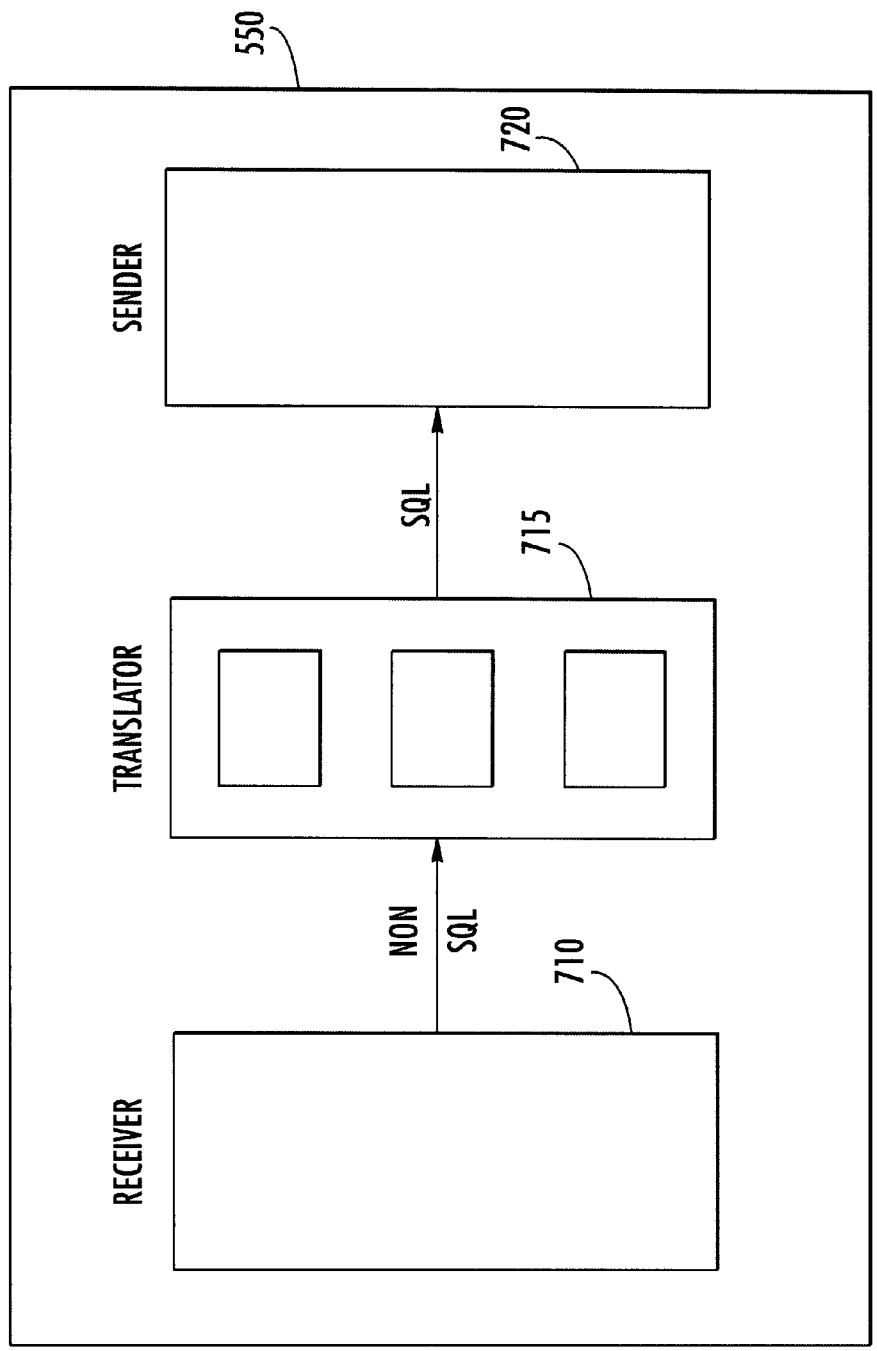
FIG. 6 is an exemplary block diagram illustrating the translation process 550 of the present invention.

A non-SQL client may access the data stored in the relational database 540 via the translation process 550, data propagation selection process 510, and the function management process 510. A non-SQL client may send an access request, which may include a query request, to the TPF based system 400, which in turn sends this request to the non-TPF based system 500. For example, the request may be in the form of traditional TPF based commands, English commands, or any other form. The request is received by the data propagation selection process 440, which in turn, sends the request to the function management process 510. Both the data propagation selection process 440 and function management process 510 were described in the following description and thus, only the differences will be described now. The difference lies in step 920, where the parsed query request is sent to the translation process 550, which is shown in FIG. 6. The parsed request is received by the receiver 710 of the translation process 550. The receiver process sends the parsed request to the translator 715, which converts the request into the SQL-DML statements. Then, the SQL-DML statements are sent to sender 720, which sends the request to the relational database 540.

Once the request is sent to the relational database 540, the function management process 510 may be used to process the results. For example, once the database returns the results, these results may be sent to the non-SQL client, as indicated by step 935. Thus, with the present invention, even a non-SQL client may be able to query data stored in the relational database 540.

EXEMPLARY IMPLEMENTATION

Figure 7:
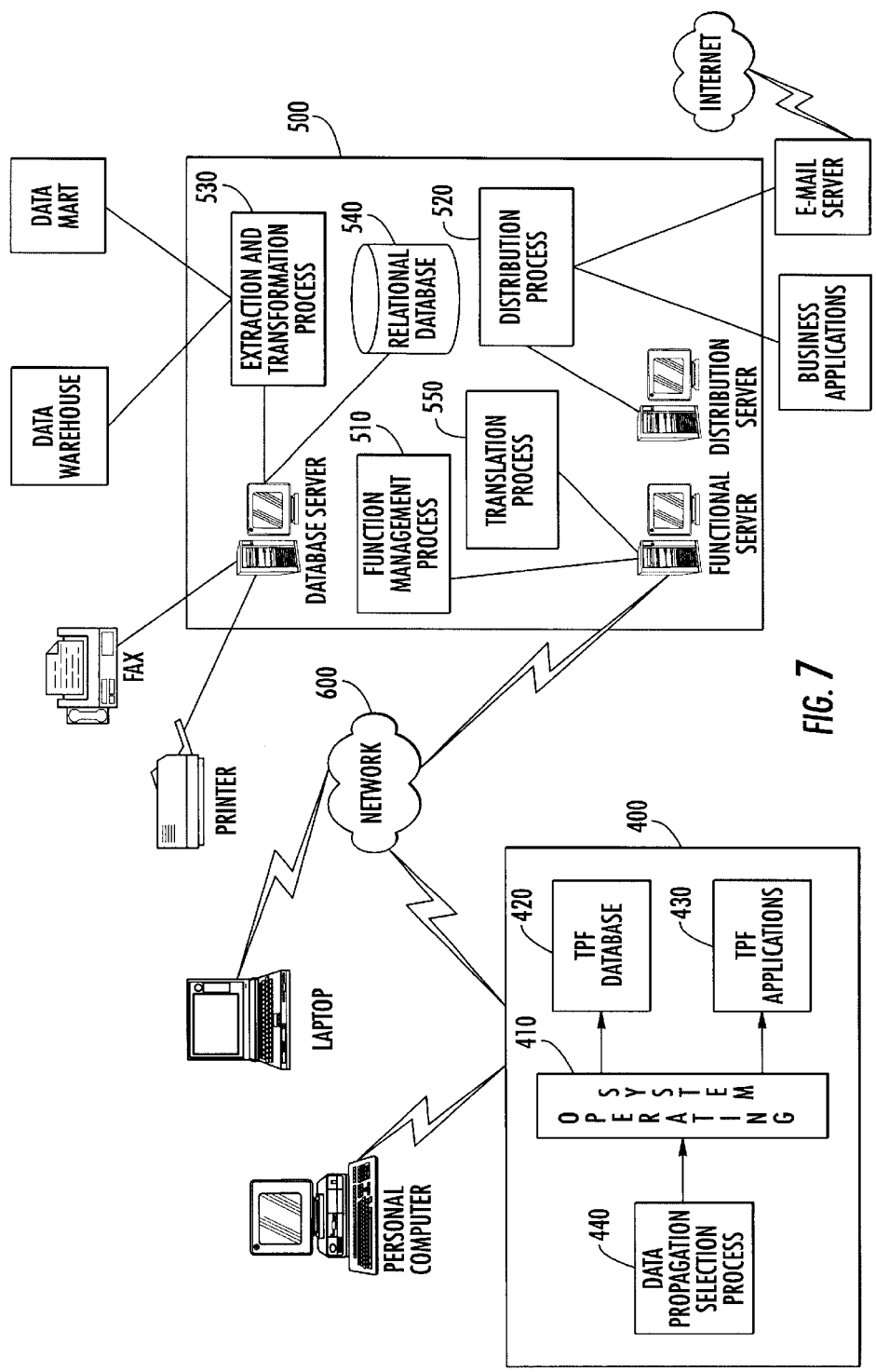
FIG. 7 is an block diagram illustrating an exemplary implementation of the present invention.

FIG. 7 illustrates an exemplary implementation of the location of the processes and use of the propagated data by a variety of clients. In both the TPF based system 400 and the non-TPF based system 500, the processes and applications may be stored on a single computer or distributed among several computers, for example, to provide load-balancing. As shown in FIG. 7, the function management process 510, distribution process 520, extraction and transformation process 530, translation process 550, and the relational database 540 may exist on three servers, the functional server, distribution server, and database server. In another embodiment, the function management process 510, distribution process 520, extraction and transformation process 530, the translation process 550, and the relational database 540 may exist on one server. These and other configurations are known to those skilled in the art and are also within the scope of the present invention.

Moreover, the operating environment for the various servers shown in FIG. 7 is known to those skilled in the art and is also within the scope of the present invention. For example, the database server may be part of a RDBMS and may operate in any open relational database environment, for example, DB2, Oracle, Ingres, Informix, or Sybase. The operating system for the database and distribution servers may be Unix or an equivalent system. The database and distribution servers may execute upon, for example, SMP (symmetric multi-processors) such as IBM's RISC System/600 Models J30 or R30, a MPP (massively parallel processors), such as IBM's SP 2.1, or Sun Solaris models such as Sun E10000 Models. The distribution server may utilize readily available communication protocols, such as CORBA's IIOP, for interfacing with clients. Furthermore, as described in the foregoing description, the components shown in FIG. 7 may be connected in single or a combination of any type of computer network, such as the Internet, an Intranet, an Extranet, a LAN, or a WAN. For example, the database, functional, and distribution servers may be connected in a LAN, which may be connected to the TPF based system 400 via network 600, such as a WAN, i.e., the network 600 may be a WAN.

Moreover, as shown in FIG. 7, the data stored in the relational database 540 may be used by a variety of clients. For example, the laptop computer, printer, and fax machine may use applications, such as RDBMS applications, to access the data directly from the relational database 540. Moreover, the data may be provided by the distribution process 520 to registered systems, such as a system running business applications. Also, the data may be e-mailed via the distribution process using the e-mail server, which may connected to the Internet. The data may also be provided to a data ware house or a data mart, as shown in FIG. 7. Finally, the personal computer, which is connected to the TPF based system 400 and may be running emulation software, may access the data from either the TPF database 420 or the relational database 540, for example, with the assistance of the data propagation selection process, the function management process 510, and the translation process 550.

While the examples given in the foregoing description related to airlines and travel agents, the present invention is not limited to the airline industry. It will be apparent to those skilled in the art that various modifications and variations can be made in the system and method of the present invention and in construction of this invention without departing from the scope or spirit of the invention.

Moreover, other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A data processing system comprising;
   a transaction processing facility (TPF) based computer comprising data storage that comprises TPF data;
   a server computer, coupled to the TPF based computer, for receiving the TPF data propagated by the TPF based computer from said TPF based computer's data storage and for generating a structured query language (SQL) statement reflecting the received TPF data; and
   a relational database associated with the server computer and separate from said data storage of said TPF based computer, wherein said relational database comprises data that has been propagated from the TPF based computer's data storage and converted into a structure that is different from the structure of the data as stored in the TPF based computer's data storage, where the data stored in said relational database is updated by using the generated SQL statement, and can be accessed from said relational database using SQL statements.

2. A data processing system according to claim 1, further comprising a first client terminal, coupled to the TPF based computer, for accessing the TPF data.

3. A data processing system according to claim 2, wherein the first client terminal inputs new data into the TPF based computer, retrieves the TPF data, changes the TPF data, and deletes the TPF data.

4. A data processing system according to claim 2, wherein the first client terminal accesses data from the relational database.

5. A data processing system according to claim 4, wherein the first client terminal retrieves and queries the data stored in the relational database.

6. A data processing system according to claim 1, further comprising a second client terminal, coupled to the server computer, for accessing data stored in the relational database.

7. A data processing system according to claim 6, wherein the second client terminal accesses the data from the relational database independently of the TPF based computer.

8. A data processing system according to claim 7, wherein the second client terminal retrieves and queries the data stored in the relational database.

9. A data processing system according to claim 1, wherein the TPF based computer asynchronously propagates the TPF data to the server computer.

10. A data processing system according to claim 1, wherein the server computer includes a distribution means for receiving the propagated TPF data from the server computer after update of the relational database.

11. A data processing system according to claim 1, wherein the distribution means sends the propagated TPF data in real time to a registered system.

12. A data processing system according to claim 10, wherein the distribution means e-mails the propagated data to a customer.

13. A data processing system according to claim 1, wherein the server computer includes an extraction and transformation means for extracting the data stored in the relational database, transforming the extracted data, and sending of the transformed data to an extraction and transformation client.

14. A data processing system according to claim 13, wherein the extraction and transformation client is chosen from a data mart and a data warehouse.

15. A data propagation method, comprising the steps of:
    propagating data from a data storage of a section processing facility (TPF) based computer to a server computer;
    generating via the server computer a structured query language (SQL) statement reflecting the propagated data; and
    updating a relational database associated with the server computer using the SQL statement, where the relational database is separate from the data storage of the TPF based computer and comprises data that has been propagated from the TPF based computer's data storage and converted into a structure that is different from the structure of the data as stored in the TPF based computer's data storage, where the data stored in the relational database can be accessed using SQL statements.

16. The method according to claim 15, further comprising the step of accessing data from the TPF based computer using a first client terminal that is coupled to the TPF based computer.

17. The method according to claim 16, wherein the step of accessing data includes inputting new data into the TPF based computer, retrieving the TPF data, changing the TPF data, and deleting the TPF data.

18. The method according to claim 16, further comprising the step of accessing data from the relational database using the first client terminal.

19. The method according to claim 18, wherein the step of accessing includes retrieving and querying the data stored in the relational database.

20. The method according to claim 15, further comprising the step of accessing data from the relational database with a second client terminal that is coupled to the server computer.

21. The method according to claim 20, wherein the step of accessing the data is done independently of the TPF based computer.

22. The method according to claim 21, wherein the step of accessing data includes retrieving and querying the data stored in the relational database.

23. The method according to claim 15, wherein the step of propagating data is performed asynchronously.

24. The method according to claim 15, further comprising the step of receiving propagated data by a distribution means of the server computer after updating the relational database.

25. The method according to claim 24, further comprising the step of sending the propagated data by the distribution means in real time to a registered system.

26. The method according to claim 24, further comprising the step of e-mailing the propagated data by the distribution means to a customer.

27. The method according to claim 15, further comprising the step of extracting the data from the relational database, transforming the extracted data, and sending the transformed data by an extraction and transformation means of the server computer to an extraction and transformation client.

28. The method according to claim 27, wherein the extraction and transformation client is chosen from a data mart and a data warehouse.

29. A data processing system comprising:
    a transaction processing facility (TPF) based computer comprising data storage that includes TPF data;
    a server computer including a relational database, coupled to the TPF based computer, the relational database being separate from the data storage of said TPF based computer and including a structured replica of the TPF data; and
    a client terminal for sending a miscellaneous function management request to the TPF based computer,
    wherein the TPF based computer sends the miscellaneous function management request to the server computer, which generates a structured query language (SQL) statement reflecting the miscellaneous function management request, and sends the generated SQL statement to the relational database, where the SQL statement is used to update the relational database.

30. A data processing system according to claim 29, wherein data is retrieved from the relational database by using the generated SQL statement and sent to a customer via e-mail.

31. A miscellaneous function management method, comprising the steps of:
   sending a miscellaneous function management request by a client terminal to a transaction processing facility (TPF) based computer, where the TPF based computer comprises data storage that includes TPF data;
   sending the miscellaneous function management request by the TPF based computer to a server computer, which includes a relational database separate from the data storage of the TPF based computer that has a structured replica of data stored in the data storage of the TPF based computer; and
   generating a structured query language (SQL) statement reflecting the miscellaneous function management request and sending the generated SQL statement by the server computer to the relational database;
   updating the relational database based on the SQL statement.

32. The method according to claim 31, further comprising the step of retrieving data from the relational database by using the generated SQL statement and sending the retrieved data to a customer via e-mail.

33. A computer readable medium containing instructions for causing a computer to perform a method for propagating data, comprising the steps of:
   propagating data from a data storage of a transaction processing facility (TPF) based computer to a server computer;
   generating via the server computer a structured query language (SQL) statement reflecting the propagated data; and
   updating a relational database associated with the server computer using the SQL statement where the relational database is separate from the data storage of the TPF based computer and comprises data that has been propagated from the TPF based computer's data storage and converted into a structure that is different from the structure of the data as stored in the TPF based computer's data storage, where the data stored in the relational database can be accessed using SQL statements.

34. The computer-readable medium according to claim 33, further comprising the step of accessing data from the TPF based computer using a first client terminal that is coupled to the TPF based computer.

35. The computer-readable medium according to claim 34, wherein the step of accessing data includes inputting new data into the TPF based computer, retrieving the TPF data, changing the TPF data, and deleting the TPF data.

36. The computer-readable medium according to claim 34, further comprising the step of accessing data from the relational database using the first client terminal.

37. The computer-readable medium according to claim 36, wherein the step of accessing includes retrieving and querying the data stored in the relational database.

38. The computer-readable medium according to clam 33, further comprising the step of accessing data from the relational database with a second client terminal that is coupled to the server computer.

39. The computer-readable medium according to claim 38, wherein the step of accessing the data is done independently of the TPF based computer.

40. The computer-readable medium according to claim 39, wherein the step of accessing data includes retrieving and querying the data stored in the relational database.

41. The computer-readable medium according to claim 33, wherein the step of propagating data is performed asynchronously.

42. The computer-readable medium according to claim 33, further comprising the step of receiving propagated data by a distribution means of the server computer after updating the relational database.

43. The computer-readable medium according to claim 42, further comprising the step of sending the propagated data by the distribution means in real time to a registered system.

44. The computer-readable medium according to claim 42, further comprising the step of e-mailing the propagated data by the distribution means to a customer.

45. The computer-readable medium according to claim 33, further comprising the step of extracting the data from the relational database, transforming the extracted data, and sending the transformed data by an extraction and transformation means of the server computer to an extraction and transformation client.

46. The computer-readable medium according to claim 45, wherein the extraction and transformation client is chosen from a data mart and a data warehouse.

47. A computer readable medium containing instructions for causing a computer to perform a method for miscellaneous function management, comprising the steps of:
   sending a miscellaneous function management request by a client terminal to a transaction processing facility (TPF) based computer, where the TPF based computer comprises data storage that includes TPF data;
   sending the miscellaneous function management request by the TPF based computer to a server computer, which includes a relational database separate from he data storage of the TPF based computer that has a structured replica of data stored in the data storage of the TPF based computer; and
   generating a structured query language (SQL) statement reflecting the miscellaneous function management request and sending the generated SQL statement by the server computer to the relational database;
   updating the relational database based on the SQL statement.

48. The computer-readable medium according to claim 47, further comprising the step of retrieving data from the relational database by using the generated SQL statement and sending the retrieved data to a customer via e-mail.

* * * * *